(12) United States Patent
Yoo

(10) Patent No.: US 12,520,141 B2
(45) Date of Patent: Jan. 6, 2026

(54) SIM CARD APPARATUS FOR VERIFYING AUTHENTICATION VIRTUAL CODE GENERATED FOR SECURITY OF IOT DEVICE

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 186 days.

(21) Appl. No.: 18/459,348

(22) Filed: Aug. 31, 2023

(65) Prior Publication Data

US 2023/0413048 A1 Dec. 21, 2023

Related U.S. Application Data

(63) Continuation of application No. PCT/KR2022/003089, filed on Mar. 4, 2022.

(30) Foreign Application Priority Data

Mar. 4, 2021 (KR) .................. 10-2021-0029035
Oct. 8, 2021 (KR) .................. 10-2021-0134399

(51) Int. Cl.
*H04L 29/00* (2006.01)
*H04W 12/06* (2021.01)
*H04W 12/72* (2021.01)
*G16Y 30/10* (2020.01)

(52) U.S. Cl.
CPC ........... *H04W 12/06* (2013.01); *H04W 12/72* (2021.01); *G16Y 30/10* (2020.01)

(58) Field of Classification Search
CPC ....... H04W 12/06; H04W 12/72; G16Y 30/10

USPC ........................................................... 726/6
See application file for complete search history.

(56) References Cited

U.S. PATENT DOCUMENTS

| | | |
|---|---|---|
| 9,497,572 B2 | 11/2016 | Britt et al. |
| 9,641,400 B2 | 5/2017 | Britt et al. |
| 9,832,173 B2 | 11/2017 | Britt et al. |
| 9,894,473 B2 | 2/2018 | Britt et al. |
| 9,942,328 B2 | 4/2018 | Holland et al. |
| 10,291,595 B2 | 5/2019 | Britt et al. |

(Continued)

FOREIGN PATENT DOCUMENTS

| | | |
|---|---|---|
| EP | 3 712 830 A1 | 9/2020 |
| KR | 10-1316466 B1 | 10/2013 |

(Continued)

OTHER PUBLICATIONS

International Search Report issued in PCT/KR2022/003089; mailed Jun. 13, 2022.

(Continued)

*Primary Examiner* — Jeffrey C Pwu
*Assistant Examiner* — Michael D Anderson
(74) *Attorney, Agent, or Firm* — Studebaker Brackett PLLC

(57) ABSTRACT

Provided is a SIM card apparatus for verifying authentication virtual code generated for security of an IoT device. The apparatus comprises: a communication module for receiving an authentication virtual code generated by a control server on the basis of command information of at least one IoT device; and a verification module formed in an applet form and verifying the authentication virtual code on the basis of verification algorithm.

14 Claims, 10 Drawing Sheets

(56) References Cited

U.S. PATENT DOCUMENTS

| | | |
|---|---|---|
| 10,419,930 B2 | 9/2019 | Holland et al. |
| 10,512,005 B2 | 12/2019 | Horn et al. |
| 10,581,875 B2 | 3/2020 | Holland et al. |
| 2006/0280150 A1* | 12/2006 | Jha .................. H04W 8/22 370/338 |
| 2016/0147506 A1 | 5/2016 | Britt et al. |
| 2016/0149767 A1 | 5/2016 | Britt et al. |
| 2016/0150021 A1 | 5/2016 | Britt et al. |
| 2016/0180100 A1 | 6/2016 | Britt et al. |
| 2016/0182459 A1 | 6/2016 | Britt et al. |
| 2016/0353274 A1* | 12/2016 | Chichierchia ....... H04W 8/18 |
| 2017/0208432 A1 | 7/2017 | Britt et al. |
| 2017/0342741 A1 | 11/2017 | Holland et al. |
| 2017/0346836 A1 | 11/2017 | Holland et al. |
| 2017/0347264 A1 | 11/2017 | Holland et al. |
| 2018/0152420 A1 | 5/2018 | Britt et al. |
| 2019/0104447 A1 | 4/2019 | Horn et al. |
| 2020/0051065 A1 | 2/2020 | Yoo |
| 2020/0051075 A1 | 2/2020 | Yoo |
| 2020/0259848 A1 | 8/2020 | Holland et al. |
| 2020/0320526 A1 | 10/2020 | Yoo |
| 2020/0404501 A1* | 12/2020 | Kang .................. H04W 8/183 |
| 2020/0410476 A1 | 12/2020 | Yoo |
| 2021/0065163 A1 | 3/2021 | Yoo |
| 2021/0157931 A1 | 5/2021 | Yoo |
| 2021/0185034 A1 | 6/2021 | Yoo |
| 2021/0365921 A1 | 11/2021 | Yoo |
| 2021/0390543 A1 | 12/2021 | Yoo |
| 2022/0109985 A1 | 4/2022 | Yoo |

FOREIGN PATENT DOCUMENTS

| | | |
|---|---|---|
| KR | 10-2017-0097143 A | 8/2017 |
| KR | 10-2019-0013867 A | 2/2019 |
| KR | 10-2020-0018200 A | 2/2020 |
| KR | 10-2148365 B1 | 8/2020 |
| WO | 2016/100200 A1 | 6/2016 |
| WO | 2017/205770 A1 | 11/2017 |
| WO | 2020/032498 A1 | 2/2020 |

OTHER PUBLICATIONS

Extended European Search Report issued in EP 25 17 1302.0-1218 by the European Patent Office on Jun. 2, 2025, which is related to U.S. Appl. No. 18/459,348.

Extended European Search Report issued in EP 22 76 3635.4-1213 by the European Patent Office on Mar. 25, 2024, which is related to U.S. Appl. No. 18/459,348.

\* cited by examiner

SIM CARD APPARATUS FOR VERIFYING AUTHENTICATION VIRTUAL CODE GENERATED FOR SECURITY OF IOT DEVICE

CROSS-REFERENCE TO RELATED APPLICATIONS

The present application is a continuation of International Patent Application No. PCT/KR2022/003089, filed on Mar. 4, 2022, which is based upon and claims the benefit of priority to Korean Patent Application Nos. 10-2021-0029035 filed on Mar. 4, 2021, 10-2021-0134399 filed on Oct. 8, 2021 and 10-2022-0027772 filed on Mar. 4, 2022. The disclosures of the above-listed applications are hereby incorporated by reference herein in their entirety.

BACKGROUND

Embodiments of the inventive concept described herein relate to a subscriber identification module (SIM) card apparatus for verifying an authentication virtual code generated for security of an IoT device.

In general, an IoT environment consists of an IoT device that is installed on a control object and controls the control object and detects the status of the control object, a server that is managed by an administrator and receives and processes pieces of information measured by the IoT device or transmits commands for controlling the control object to the IoT device, and a router that delivers information between the IoT device and the server.

When receiving a command sent from the server through the router, a conventional IoT device performs only a function controlled depending on the command. However, it was difficult for the conventional IoT device to perform security-related functions due to poor hardware specifications, and thus the conventional IoT device may be at risk of being hacked.

Accordingly, a security control method is needed such that the IoT device is capable of being controlled only for normal access.

SUMMARY

Embodiments of the inventive concept provide a SIM card apparatus for verifying an authentication virtual code generated for security of an IoT device.

Problems to be solved by the inventive concept are not limited to the problems mentioned above, and other problems not mentioned will be clearly understood by those skilled in the art from the following description.

According to an embodiment, a SIM card apparatus includes a communication module that receives an authentication virtual code generated by a control server based on command information of at least one IoT device, and a verification module formed in an applet form and verifying the authentication virtual code based on a verification algorithm. The SIM card apparatus is included in a relay apparatus configured to connect the control server and the IoT device.

In an embodiment of the inventive concept, when verification request information including the authentication virtual code is received from the relay apparatus through the communication module, the verification module may verify the authentication virtual code based on the verification algorithm and may deliver the verified result to the relay apparatus through the communication module. The relay apparatus may determine whether to deliver the command information to the IoT device, based on the verified result.

In an embodiment of the inventive concept, the verification request information may be received from the relay apparatus only when the command information is included in a specific area of a predetermined protocol.

In an embodiment of the inventive concept, the verification module may extract a plurality of detailed codes included in the authentication virtual code, and may verify the authentication virtual code based on a correlation between the plurality of detailed codes.

In an embodiment of the inventive concept, firmware of the relay apparatus may be required to be changed for a verification operation of the verification module.

According to an embodiment, a SIM card apparatus includes a communication module that receives an authentication virtual code generated by a control server based on command information of at least one IoT device, and a verification module formed in an applet form and verifying the authentication virtual code based on a verification algorithm. The SIM card apparatus is included in a connection device for controlling the IoT device.

In an embodiment of the inventive concept, when verification request information including the authentication virtual code is received from the connection device through the communication module, the verification module may verify the authentication virtual code based on the verification algorithm and may deliver the verified result to the connection device through the communication module. The connection device may determine whether to deliver the command information to the IoT device, based on the verified result.

In an embodiment of the inventive concept, the verification request information may be received from the connection device only when the command information is included in a specific area of a predetermined protocol.

In an embodiment of the inventive concept, the verification module may extract a plurality of detailed codes included in the authentication virtual code, and may verify the authentication virtual code based on a correlation between the plurality of detailed codes.

According to an embodiment, a SIM card apparatus includes a communication module that receives an authentication virtual code generated by a control server based on command information of at least one IoT device, and a verification module formed in an applet form and verifying the authentication virtual code based on a verification algorithm. The SIM card apparatus is included in the IoT device.

In an embodiment of the inventive concept, when verification request information including the authentication virtual code is received from the IoT device through the communication module, the verification module may verify the authentication virtual code based on the verification algorithm and may deliver the verified result to the IoT device through the communication module. The IoT device may operate based on the verified result and the command information.

In an embodiment of the inventive concept, the verification request information may be received from the IoT device only when the command information is included in a specific area of a predetermined protocol.

In an embodiment of the inventive concept, the verification module may extract a plurality of detailed codes included in the authentication virtual code, and may verify the authentication virtual code based on a correlation between the plurality of detailed codes.

In an embodiment of the inventive concept, firmware of the IoT device may be required to be changed for a verification operation of the verification module.

In addition, another method and another system for implementing the inventive concept, and a computer-readable recording medium for recording a computer program for performing the method may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
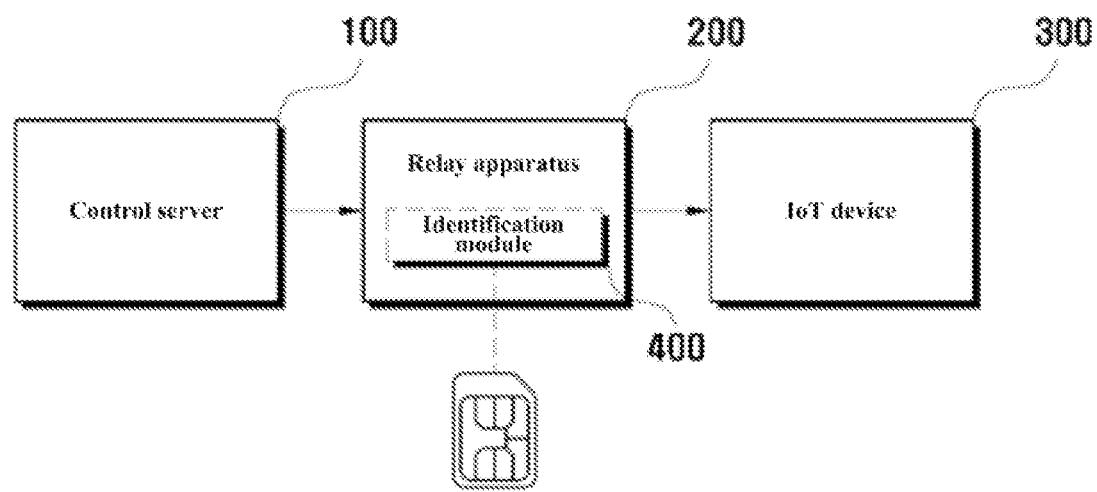
FIG. 1 is a diagram for describing a SIM-based IoT device authentication system, according to an embodiment of the inventive concept.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, embodiments of the inventive concept will be described in detail with reference to accompanying drawings.

Prior to a description, the meaning of terms used in the present specification will be described briefly. However, because the description of terms is used to help the understanding of this specification, it should be noted that if the inventive concept is not explicitly described as a limiting matter, it is not used in the sense of limiting the technical idea of the inventive concept.

In this specification, a 'SIM card' may be an implementation of a subscriber identification module, and may be understood as including USIM chip, a USIM card, USIM, SIM, and eSIM.

In this specification, a 'character' is a component constituting a code and includes all or part of uppercase alphabet characters, lowercase alphabet characters, numerals, and special characters.

In this specification, a 'code' refers to a string of characters.

In this specification, an 'authentication virtual code' refers to a code generated by an authentication virtual code generation means, and means a code used to perform IoT device authentication in an authentication virtual code verification means. That is, the 'authentication virtual code' refers to a virtual cord temporarily assigned for each unit count to verify access to the IoT device. Here, the authentication virtual code generation means may be a control server according to an embodiment, but is not limited thereto.

In this specification, a 'detailed code' refers to a part of codes included in the authentication virtual code.

In this specification, a 'unit count' refers to a unit that is set to a specific time interval and defined to be changed as a time interval elapses. For example, 1 count may be used after being set to a specific time interval (e.g., 1.5 seconds).

In this specification, an 'authentication virtual code generation function' refers to a function used to generate an authentication virtual code.

In this specification, a 'storage location' refers to a point (count) on a track corresponding to a point in time when the registration of the IoT device is requested by a user.

In this specification, the 'user' may be a user employing an IoT device, but is not limited thereto.

Hereinafter, a SIM-based IoT device authentication system for verifying access to an IoT device when the SIM is included in a relay apparatus will be described in detail with reference to FIGS. 1 and 2.

FIG. 1 is a diagram for describing a SIM-based IoT device authentication system, according to an embodiment of the inventive concept.

Figure 2:
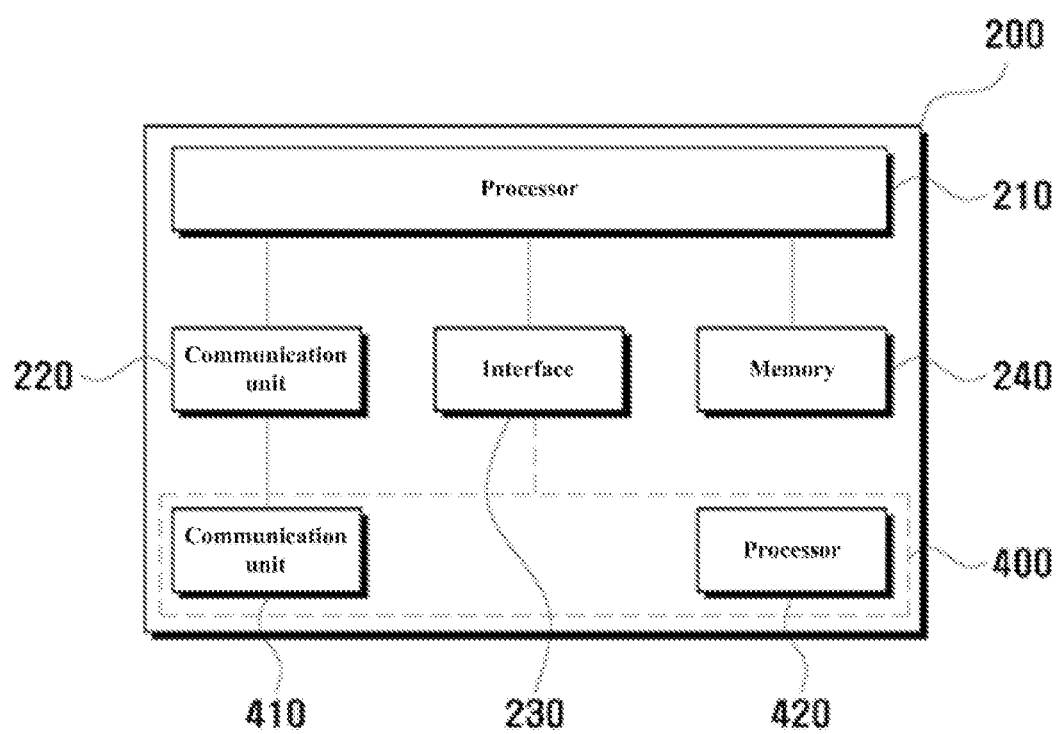
FIG. 2 is a block diagram for describing a relay apparatus, according to an embodiment of the inventive concept.

FIG. 2 is a block diagram for describing a relay apparatus, according to an embodiment of the inventive concept.

As shown in FIG. 1, an SIM-based IoT device authentication system (hereinafter, referred to as a "system") includes a control server 100, a relay apparatus 200, an IoT device 300, and an identification module 400. Herein, the system may include fewer or more components than the components illustrated in FIG. 1.

The control server 100 may transmit control command information to the at least one IoT device 300 to control an operation of the at least one IoT device 300, and may receive and monitor various types of information from the at least one IoT device 300. The control server 100 may be a server of a company providing IoT device-related services. For example, the control server 100 may be a server of a communication service provider, but is not limited thereto.

The relay apparatus 200 may be a device that serves as a relay between different networks, and may transmit control command information of the control server 100 to the IoT device 300.

At this time, the relay apparatus 200 may verify access of the control server 100 and may deliver control command information to the IoT device 300 only for normal access. Accordingly, a situation in which the IoT device 300 is exposed to risk of hacking may be prevented.

The IoT device 300 may be a device based on the Internet of Things, and may operate depending on the control command information by the control server 100, but is not limited thereto. For example, the IoT device 300 may be controlled by a terminal (not shown) of a user employing the IoT device 300. In this case, the relay apparatus 200 may verify control command information transmitted from the user's terminal (not shown).

Here, the IoT device 300 may include a sensor, a display, and a camera such as a CCTV, but is not limited thereto.

According to an embodiment, the identification module 400 may be an applet in a SIM card provided by a communication service provider. In this case, a SIM card including an identification module may be inserted into the relay apparatus 200.

According to an embodiment, the identification module 400 may be a software program installed or embedded in the relay apparatus 200.

Here, the identification module 400 may store information related to the specific IoT device 300. For example, the identification module 400 may include at least one of unique identification information of the specific IoT device 300, ID, a password, a command format, and a verification algorithm. Here, the unique identification information may be a serial number of the specific IoT device 300, but is not limited thereto. The verification algorithm may be an algorithm for verifying an authentication virtual code provided together with command information from the control server 100, and may be different for each IoT device 300.

When the identification module 400 is inserted (or installed) into the relay apparatus 200, the IoT device 300 may be connected to the relay apparatus 200 by wire or wirelessly, and thus the control server 100 may control the IoT device 300 through the relay apparatus 200.

In an embodiment, when the relay apparatus 200 includes the one identification module 400, the relay apparatus 200 may request registration of the IoT device 300 by transmitting information related to the IoT device 300 to the control server 100. The control server 100 may complete registration by matching the relay apparatus 200 requesting the registration and the IoT device 300. Accordingly, the relay apparatus 200 may verify access to the one IoT device 300 such that the one IoT device 300 is capable of being normally controlled.

In another embodiment, in the case where the relay apparatus 200 includes the plurality of identification modules 400, when each of the identification modules 400 is inserted (or installed) into the relay apparatus 200, the relay apparatus 200 may request registration of the IoT devices 300 by transmitting information related to the different IoT devices 300 to the control server 100. The control server 100 may complete registration by matching the relay apparatus 200 requesting the registration with the different IoT devices 300. Accordingly, the relay apparatus 200 verifies access to the different IoT devices 300 such that each of the IoT devices 300 is capable of being normally controlled.

Referring to FIG. 2, the relay apparatus 200 may include a processor 210, a communication unit 220, an interface 230, and a memory 240. Herein, the relay apparatus 200 may include fewer or more components than the components illustrated in FIG. 2.

The communication unit 220 may include one or more modules that make wireless or wired communication between the relay apparatus 200 and the control server 100, between the relay apparatus 200 and the IoT device 300, between the relay apparatus 200 and the identification module 400, between the relay apparatus 200 and an external terminal (not illustrated), or between the relay apparatus 200 and a communication network (not illustrated).

Here, the external terminal (not shown) may be a terminal of a user employing the IoT device 300, but is not limited thereto.

Here, various types of communication networks may be used. For example, wireless communication methods such as wireless LAN (WLAN), Wi-Fi, Wibro, Wimax, High Speed Downlink Packet Access (HSDPA), and the like or wired communication methods such as Ethernet, xDSL (ADSL or VDSL), Hybrid Fiber Coax (HFC), Fiber to The Curb (FTTC), Fiber To The Home (FTTH), and the like may be used in the communication network (not illustrated).

In the meantime, the communication network (not illustrated) is not limited to the communication method described above, and may include all types of communication methods widely known or to be developed in the future in addition to the above communication methods.

The interface 230 may be a port formed such that the identification module 400 is inserted into the relay apparatus 200.

The memory 240 may store data supporting various functions of the relay apparatus 200. The memory 240 may store a plurality of application programs (or applications) running in the relay apparatus 200, at least one process for an operation of the relay apparatus 200, pieces of data, and instructions. At least part of the application programs may be present for basic functions of the relay apparatus 200.

In addition to an operation associated with the application program, the processor 210 may generally control overall operations of the relay apparatus 200. The processor 210 may provide or process appropriate information or functions to the control server 100 or the IoT device 300, by processing a signal, data, information, or the like, which is input or output through the above-described components, or driving the application program stored in the memory 240.

Besides, the processor 210 may control at least part of the components described with reference to FIG. 1 to operate the application program stored in the memory 240. Furthermore, the processor 210 may combine and operate at least two or more of the components included in the relay apparatus 200 to operate the application program.

Referring to FIG. 2, the identification module 400 may include a communication unit 410 and a processor 420. Herein, the identification module 400 may include fewer or more components than the components illustrated in FIG. 2.

The communication unit 410 may include one or more modules that make wireless or wired communication between the identification module 400 and the relay apparatus 200.

The processor 420 may perform the verification by using information, which is related to the IoT device 300 and which is stored in the identification module 400, and verification request information delivered from the relay apparatus 200 through the communication unit 410.

Hereinafter, a SIM-based IoT device authentication method for verifying access to an IoT device based on a subscriber identification module will be described in detail with reference to FIGS. 3 to 6.

Figure 3:
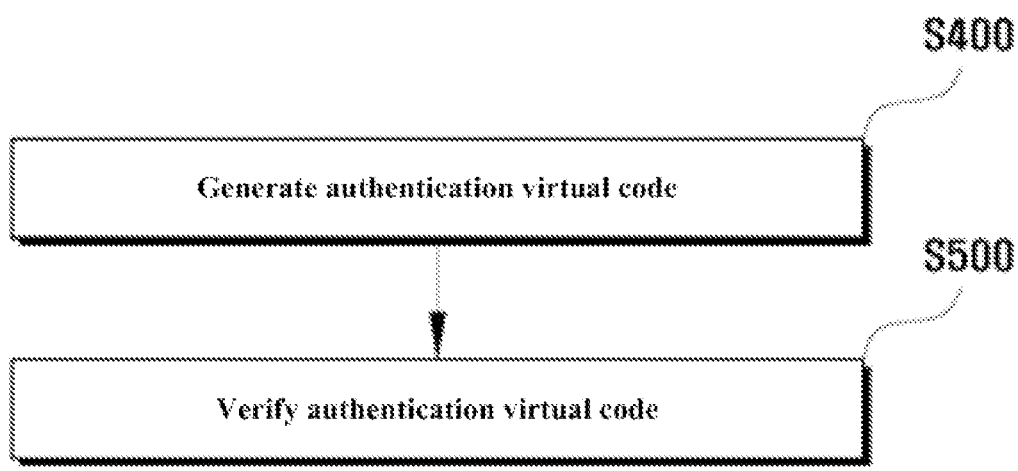
FIG. 3 is a SIM-based IoT device authentication method, according to an embodiment of the inventive concept.

FIG. 3 is a SIM-based IoT device authentication method, according to an embodiment of the inventive concept.

Figure 4:
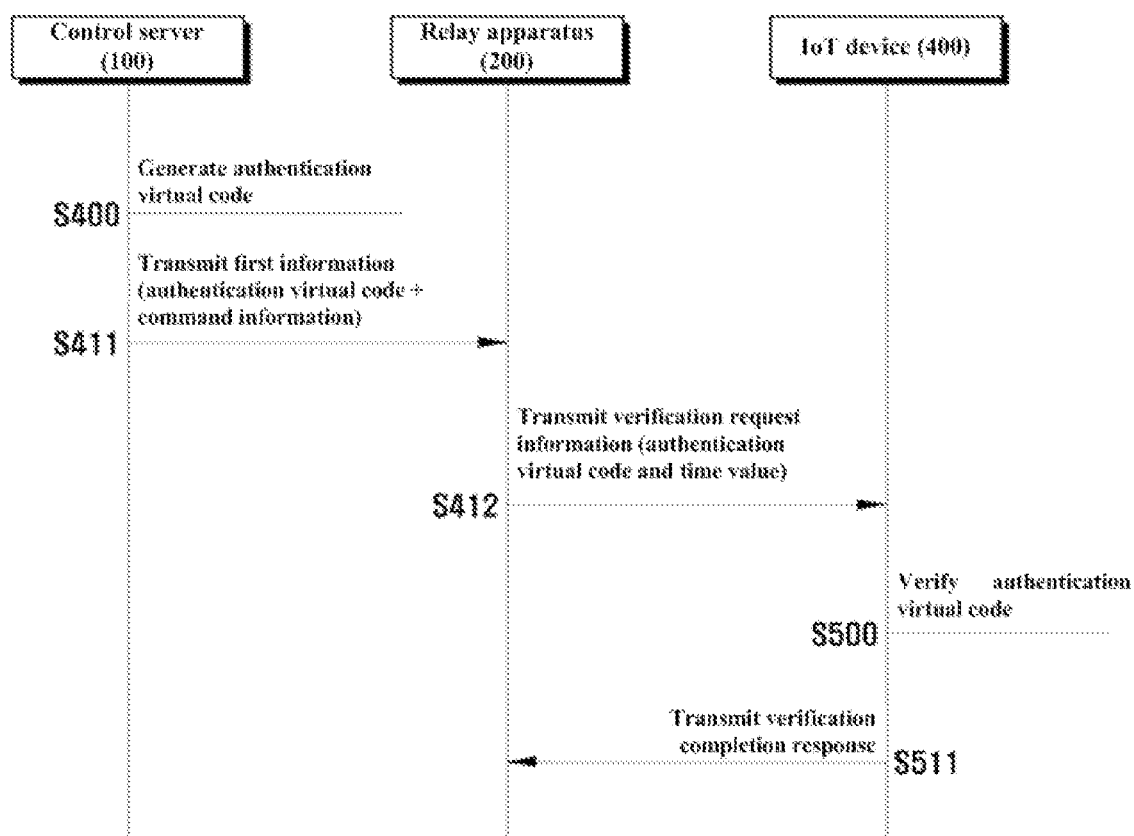
FIG. 4 is a diagram for describing a first embodiment of a SIM-based IoT device authentication method, according to an embodiment of the inventive concept.

FIG. 4 is a diagram of the identification module 400 for describing a first embodiment of the SIM-based IoT device authentication method, according to an embodiment of the inventive concept.

Figure 5:
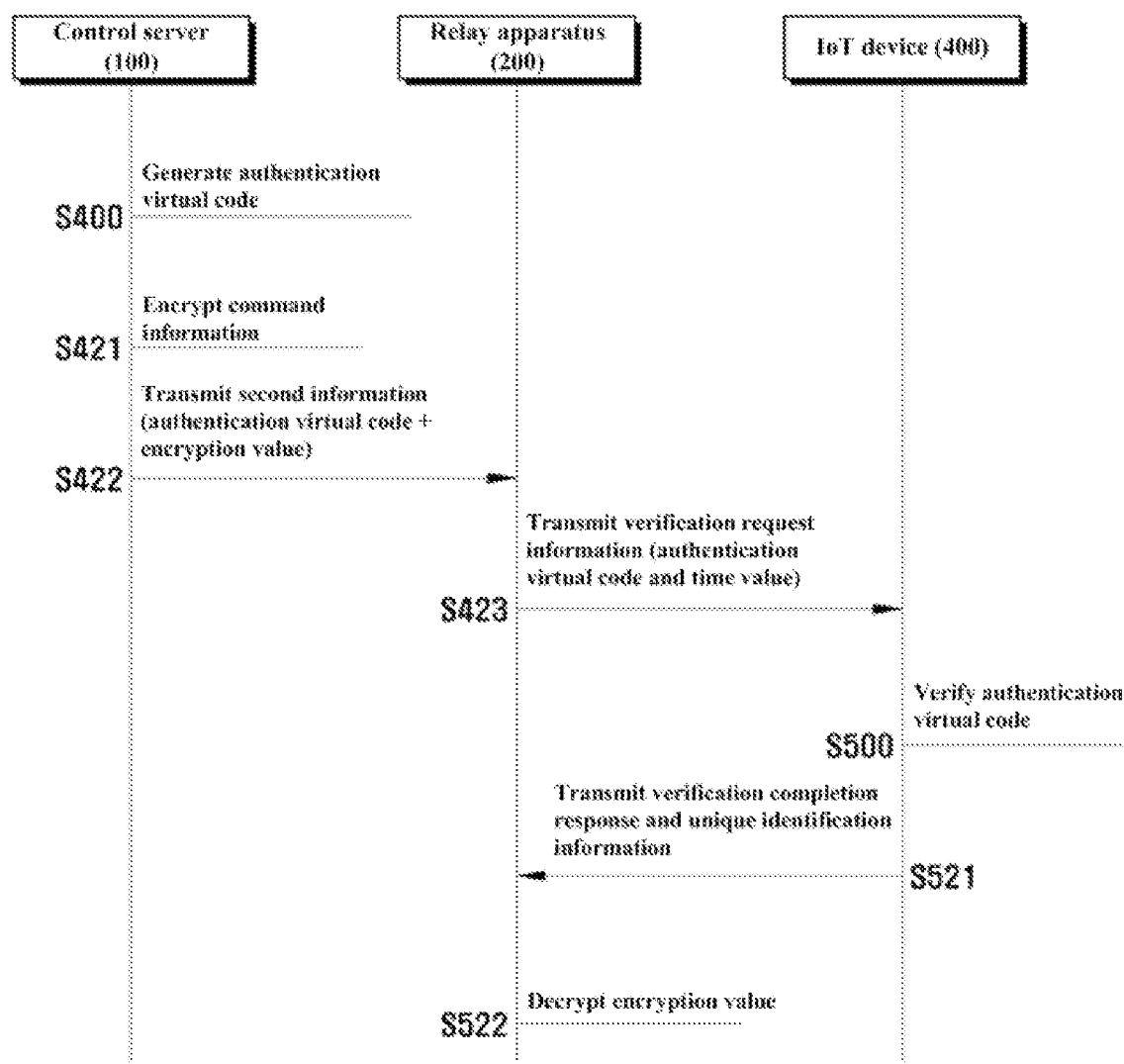
FIG. 5 is a diagram for describing a second embodiment of a SIM-based IoT device authentication method, according to an embodiment of the inventive concept.

FIG. 5 is a diagram for describing a second embodiment of a SIM-based IoT device authentication method, according to an embodiment of the inventive concept.

Figure 6:
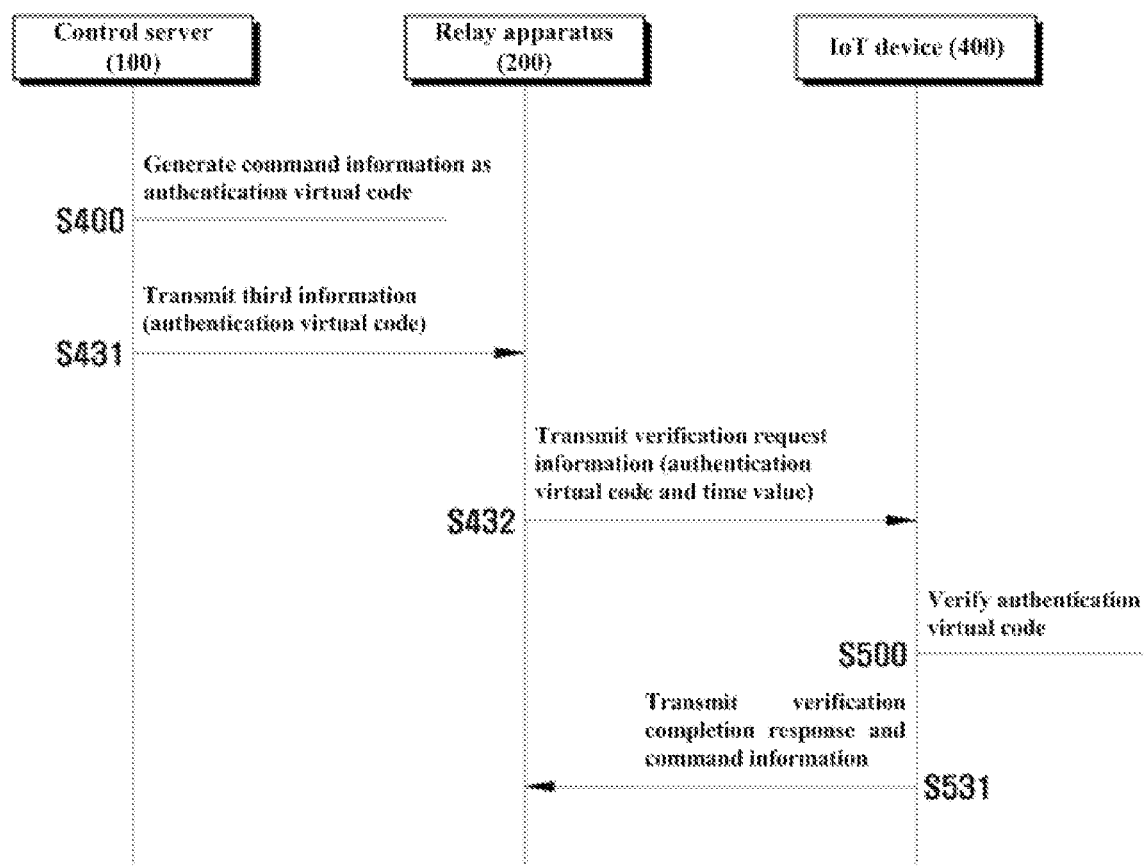
FIG. 6 is a diagram for describing a third embodiment of a SIM-based IoT device authentication method, according to an embodiment of the inventive concept.

FIG. 6 is a diagram for describing a third embodiment of a SIM-based IoT device authentication method, according to an embodiment of the inventive concept.

Referring to FIG. 3, the control server 100 may generate an authentication virtual code (S400). That is, the control server 100 may serve as an authentication virtual code generation means.

In more detail, the control server 100 may transmit command information about the IoT device 300 to be controlled to the relay apparatus 200, and may generate an authentication virtual code for authenticating the fact that access of the control server 100 is normal access and may transmit the authentication virtual code to the relay apparatus 200 together with the command information.

Here, the command information may include at least one of an ID, a password, and a command of the IoT device 300. In more detail, because information related to the IoT device 300 is stored in the control server 100 when the IoT device 300 is registered, the control server 100 may transmit the command information for controlling the registered IoT device 300.

When the command information and the authentication virtual code are received, the identification module 400 included in the relay apparatus 200 may verify the authentication virtual code (S500). That is, the identification module 400 may serve as an authentication virtual code generation means.

In more detail, when receiving the command information and the authentication virtual code from the control server 100, the relay apparatus 200 may request verification by transmitting verification request information to the identification module 400. The identification module 400 may perform verification upon request and may deliver the verified result to the relay apparatus 200. The relay apparatus 200 may determine whether to deliver the command information to the IoT device 300, based on the verified result.

Here, the verification request information may include an authentication virtual code and a time value. According to an embodiment, the time value may be a time value at a point in time when the authentication virtual code is received by the relay apparatus 200, or a time value at a current time point.

Hereinafter, a first embodiment of generating and verifying an authentication virtual code will be described in detail with reference to FIG. 4.

The control server 100 may generate an authentication virtual code (S400).

The control server 100 may generate first information by combining the authentication virtual code and command information about the specific IoT device 300 in a predetermined manner and may transmit the generated first information to the relay apparatus 200 (S411).

Here, the authentication virtual code may be generated based on unique identification information of the specific IoT device 300.

In more detail, the control server 100 may generate an authentication virtual code by combining one or more detailed codes. In an embodiment, the control server 100 may generate the authentication virtual code by combining a plurality of detailed codes depending on a specific rule by using an authentication virtual code generation function. The authentication virtual code generation function may include a rule (i.e., a detailed code combination function) that combines a plurality of detailed codes. Here, the authentication virtual code generation function may be matched with a verification algorithm of the specific IoT device 300.

Various methods may be applied to a method of generating one authentication virtual code by combining the plurality of detailed codes. As the example of the detailed code combination function, the control server 100 may generate the authentication virtual code in the manner of alternately positioning the first code of N-digits and the second code of N-digits. Furthermore, as another example, the detailed code combination function may be a function to combine the second code behind the first code. As the length of the detailed code included in the authentication virtual code increases, the detailed code combination function may be generated variously.

The control server 100 may generate one or more detailed codes. The authentication virtual code generation function includes each detailed code generation function. For example, the authentication virtual code generation function generates the plurality of detailed codes by using the plurality of detailed code generation functions and generates a virtual card number by using a detailed code combination function for combining the plurality of detailed codes.

In an embodiment, the control server 100 includes a first function and a second function as detailed code generation functions to generate a first code and a second code. The first code and the second code have a correlation for verifying an authentication virtual code within the relay apparatus 200 including an authentication virtual code verification means. However, the control server 100 may include a first function for generating the first code and a second function for generating the second code as detailed code generation functions to improve security, and may not include data for the correlation between the first code and the second code.

Furthermore, in an embodiment, when the authentication virtual code is generated through the combination according to the specific rule of the first code and the second code, the first code and the second code may have a role of searching for a storage location of a real value within a search algorithm. For example, the first code is set to a start point at which a storage location is found, and the second code is set to a search path from the start point to a storage location of the user identification information (i.e., an area where the real value is stored) depending on a specific search method. Afterward, when the authentication virtual code generated normally for each unit count is provided from the control server 100, the identification module 400 determines that a point moving along the search path corresponding to the second code from the start point corresponding to the first code is an area where the user identification information is stored. The detailed method of searching for the storage location of the real value based on the first code and the second code constituting the authentication virtual code will be described later.

In an embodiment of a method in which the control server 100 generates a detailed code, the control server 100 generates a new detailed code for each unit count, and thus the control server 100 generates a new authentication virtual code for each unit count. The authentication virtual code newly generated for each unit count is not generated redundantly. In particular, the control server 100 may be configured such that the authentication virtual code newly generated for each unit count is not redundantly generated depending on the registration of the specific IoT device 300 during a predetermined duration as well as not being generated between the IoT devices 300.

In the detailed embodiment of preventing an authentication virtual code from being generated redundantly, when generating the first code or the second code of N digits by using M characters, a detailed code generation function included in an authentication virtual code generation function may generate $M^N$ codes as the first code or the second code and may match each code for each count from an initial time point at which the detailed code generation function is driven. For example, when setting a unit count to 1 second, $M^N$ different codes may be matched every second from a point in time when the detailed code generation function is first driven. Moreover, when the period of using the specific detailed code generation function is set to be shorter than the time length (e.g., $M^N$ seconds in the case where 1 count is 1 second) corresponding to $M^N$ count, the first code or the second code is not redundantly generated during the usage period. That is, when the count increases with time, in the case where the control server 100 makes a control request for the specific IoT device 300 at a specific time point, the control server 100 may generate a code value matched with a count corresponding to the specific time point, as the first code or the second code.

In particular, when alphabetic uppercase characters and numbers from 0 to 9 are used as characters capable of being included in a code (i.e., using 36 characters) and 6 digits are respectively assigned to first and second codes, the control server 100 may provide $36^6$ codes as the first code and the second code. At this time, the control server 100 may provide the first code and the second code, which are changed for each count, by matching each code for each count.

In the detailed embodiment of preventing the authentication virtual code from being generated redundantly, when the usage period of a function for the specific IoT device 300 elapses, the authentication virtual code, of which the usage period is different from the previous usage period, may be generated by changing a function (i.e., a first function or a second function) to generate the first code or the second code or by changing the matching relationship between the first code and the second code. In the case where the authentication virtual code is generated by combining the first code generated by the first function and the second code generated by the second function, when the first code generation function or the second code generation function are changed, the control server 100 may apply, to a new usage period, the authentication virtual code generation function to generate the authentication virtual code, of which the period is different from the previous period, as an order in which the first code or the second code appears differs from an order in the previous usage period. Furthermore, the control server 100 may select the first function and the second function such that a code the same as the authentication virtual code used in the previous usage period does not appear as an authentication virtual code at each count in a new usage period (i.e., such that the matching relationship between the first code generated depending on the first function and the second code generated depending on the second function is not included in the matching relationship included in the previous usage period, at all counts in the new usage period). That is, after a usage period, in which $M^N$ codes are capable of being applied once, elapses, the authentication virtual code generation function, which does not generate an authentication virtual code, in a new usage period overlapping the previous usage period may be applied by adjusting of updating the authentication virtual code generation function.

Furthermore, in another embodiment, one of a plurality of listing rules that list M characters in ascending order may be applied to the authentication virtual code generation function (or the detailed code generation function). That is, the control server 100 may variously apply rules, which list M characters in ascending order, to the detailed code generation function included in the authentication virtual code generation function. For example, the listing rule that lists uppercase alphabetic characters in ascending order may be an order of A, B, C, . . . , and Z that is a general order or may be an order of A, C, B, . . . , and Z. As a listing rule is changed by the authentication virtual code generation function, the order, in which codes are matched sequentially to each count, is changed from an initial time point at which the authentication virtual code generation function is driven.

As described above, the control server 100 is described as generating an authentication virtual code. However, in more detail, the authentication virtual code may be generated by using a dedicated program for generating the authentication virtual code included in the control server 100.

Hereinafter, specific examples of the first and second codes will be described.

The authentication virtual code may include a first code and a second code as a plurality of detailed codes generated based on an elapsed time from a point in time when the authentication virtual code generation function is driven.

As a specific example of the first code and the second code, a code value (a first code value) corresponding to the first code may be a value obtained by adding a real value to an OTP code value. A code value (a second code value) corresponding to the second code may be the OTP code value. Here, the real value may include at least one of time values corresponding to unique identification information of the IoT device 300, command information, and a point in time when authentication virtual code is generated, which are stored in the control server 100.

That is, an embodiment of the first code and second code generated by the control server 100 is as follows.

First code=OTP code+Real value

Second code=OTP code

The identification module 400 may search for a real value by going through a count on a track matching the first code value as a waypoint and moving along the track in a set direction as many as a count corresponding to the second code value.

Furthermore, in another embodiment, the first code and the second code may be codes for the reference count added by the OTP code generated randomly from a time point at which the IoT device 300 is registered in the control server 100 or a time point (e.g., a time point at which the control server 100 generates the authentication virtual code) at which control is requested.

As the detailed embodiment, the control server 100 may generate the virtual security code by reflecting the virtual security code to the first code and the second code, without outputting the virtual security code to the outside. The control server 100 may generate a virtual security code value (e.g., an OTP code) based on the real value, may generate a first code of a count, to which a virtual security code value is added at the time of registering the IoT device 300, and may generate a second code of a count corresponding to the virtual security code value (i.e., generating the virtual security code itself as the second code). That is, the first code and the second code may be generated based on a count shifted by the virtual security code value from a time point 'A' at which the IoT device 300 is registered in the control server 100. The count shifted from the time point 'A' may be a count earlier or later than a count corresponding to the current time point depending on the generated virtual security code value. Afterward, the identification module 400 may search for a real value by applying the first code and the second code to a verification algorithm. In this way, it is impossible for other people to identify an order in which the first code and the second code constituting the authentication virtual code are provided, thereby improving security.

As a specific example of the first code and the second code, a code value (a first code value) corresponding to the first code may be a value obtained by adding an OTP code value to a count corresponding to a current time point based on the point in time when an authentication virtual code generation function is driven. The first code value operates as a waypoint in a process of searching for a real value. The code value (second code value) corresponding to the second code may be a value obtained by subtracting the real value from the first code value. The second code value is a count from a waypoint (the first code value) to the real value.

That is, another embodiment of the first code and second code generated by the control server 100 is as follows.

First code=Current time point count+OTP code

Second code=First code−Real value

The OTP code is a code generated by the OTP code generation function included in the detailed code generation function, and is a code generated differently every time point. Accordingly, the detailed code may be generated differently depending on a generation time point of the authentication virtual code, thereby preventing the detailed code from being redundantly generated and enhancing security.

In the first embodiment of generating and verifying an authentication virtual code according to an embodiment of the inventive concept, the authentication virtual code may be generated by using the unique identification information of the IoT device 300 as the real value.

As described above, the control server 100 may generate the authentication virtual code by combining a first code obtained by adding an OTP code value to the unique identification information value and a second code corresponding to the OTP code value.

The control server 100 may generate first information by combining the generated authentication virtual code with command information in a predetermined manner, and may transmit the first information to the relay apparatus 200.

Here, the command information may include at least one of an ID, a password, and a command of the IoT device 300 as described above.

According to an embodiment, the control server 100 may arrange and combine the authentication virtual code and the command information back and forth, or may combine the authentication virtual code and the command information in a state where the authentication virtual code and the command information are alternately positioned by 1 bit. Any combination method is applicable as long as the combination method is a method related to character or code combination.

When the first information is received from the control server 100, the relay apparatus 200 may request verification by transmitting verification request information to the identification module 400 (S412). Here, the verification request information may include an authentication virtual code and a time value in the first information. The time value may be a time value at a point in time when the first information is received by the relay apparatus 200, or a time value at a current time.

The identification module 400 may verify the authentication virtual code upon request (S500).

In more detail, the identification module 400 may extract a plurality of detailed codes included in the authentication virtual code by using the verification algorithm. The authentication virtual code may be generated by combining a plurality of detailed codes depending on the specific rule. The identification module 400 may extract the plurality of detailed codes from the authentication virtual code by applying a detailed code combination function used when the authentication virtual code is generated. For example, when the control server 100 generates the authentication virtual code obtained by combining two detailed codes (i.e., the first code and the second code), the control server 400 may separate the first code and the second code by applying the detailed code combination function to the character string array of the authentication virtual code.

In this case, the correlation between the detailed codes may be included.

In an embodiment of having a correlation between detailed codes, when the authentication virtual code includes the first code and the second code, the identification module 400 may determine a search start point corresponding to the first code and may consider a value corresponding to a point moved from the search start point along a search path corresponding to the second code as a real value. That is, the detailed code may include the first code for setting the start point of the search and the second code for setting the search path from the start point to the real value depending on the specific search method.

Furthermore, in another embodiment, as the control server 10 provides a new authentication virtual code for each unit count, the identification module 400 may set the search start point and the search path based on the first code and the second code changed for each count to search for the real value.

Furthermore, in another embodiment, to search for the real value by using a plurality of detailed codes having the correlation, the identification module 400 may include a search algorithm. The search algorithm is an algorithm capable of searching for a real value when each detailed code included in the authentication virtual code is applied. For example, in the case where the authentication virtual code includes the first code for determining the search start point of the real value and the second code for presenting the storage location direction from the search start point, when the search algorithm allows a direction to be changed to the direction corresponding to the second code at the point corresponding to the first code, the search algorithm is an algorithm that adjusts the real value to be positioned at the corresponding location. As the search algorithm is used, even though the first code and the second code included in the authentication virtual code are changed, the identification module 400 may search for the real value.

As described above, when the authentication virtual code according to an embodiment of the inventive concept is generated by combining the first code obtained by adding the OTP code value to the unique identification information value and the second code corresponding to the OTP code value, the identification module 400 may search for the real value (i.e., unique identification information) by subtracting the second code value from the first code value.

The identification module 400 compares a time point, at which the relay apparatus 200 receives the authentication virtual code (reception time), with a time point (a generation time point) at which the authentication virtual code is generated by using the authentication virtual code generation function by the control server 100, and verifies the authentication virtual code.

In an embodiment, the identification module 400 may compare the time value corresponding to the reception point of the authentication virtual code with the generation time point. When the generation time point is within a predetermined error range from the time value, the identification module 400 may determine that the received authentication virtual code is a normal code.

Also, in another embodiment, the identification module 400 extracts a plurality of detailed codes from the authentication virtual code. The identification module 400 may obtain time data at which the authentication virtual code is generated, based on the detailed code, may extract unique identification information of the IoT device 300 stored therein, may apply the extracted unique identification information together with the time data to a virtual security code generation function (e.g., an OTP function), and may generate a virtual security code. The identification module 400 may determine whether the virtual security code (i.e., the reception virtual security code) received by the control server 100 is the same as the virtual security code (i.e., the generated virtual security code) calculated by using the virtual security code generation function stored therein. Because there is a difference between a time point at which the control server 100 generates an authentication virtual code and a time point at which the relay apparatus 200 receives the authentication virtual code, the identification module 400 may calculate the virtual security code (i.e., OTP number) within a specific time range (e.g., from a time point, at which the authentication virtual code is received, until a specific count) in consideration of time delay and may determine whether there is a value the same as the reception virtual security code received from the control server 100. When the receiving virtual security code matches the generated virtual security code, the identification module 400 may determine that the authentication virtual code is normal.

In this way, when the identification module 400 completes verification by determining that the authentication virtual code is normal, the identification module 400 may transmit a response to verification completion to the relay apparatus 200 (S511).

When the response to verification completion is received from the identification module 400, the relay apparatus 200 may deliver command information in the first information to the IoT device 300. Accordingly, the IoT device 300 may be controlled only by the verified command.

Hereinafter, a second embodiment of generating and verifying an authentication virtual code will be described in detail with reference to FIG. 5.

The control server 100 may generate an authentication virtual code (S400).

The control server 100 may encrypt command information (S421).

The control server 100 may generate second information by combining the authentication virtual code and the encryption value based on the command information in a predetermined manner, and may transmit the generated second information to the relay apparatus 200 (S422).

Here, the authentication virtual code may be generated based on unique identification information of the specific IoT device 300. Because the content related to the generation of an authentication virtual code is the same as described above in the first embodiment, a detailed description thereof will be omitted.

In the second embodiment of generating and verifying an authentication virtual code according to an embodiment of the inventive concept, the authentication virtual code may be generated by using the unique identification information of the IoT device 300 as the real value.

As described above, the control server 100 may generate the authentication virtual code by combining a first code obtained by adding an OTP code value to the unique identification information value and a second code corresponding to the OTP code value.

The control server 100 may encrypt the command information by using an encryption key. Here, the encryption key may include at least one of the unique identification information and the authentication virtual code.

For example, the control server 100 may encrypt the command information by using the unique identification information as the encryption key. For another example, the control server 100 may encrypt the command information by using a value, which is obtained by combining the unique identification information and the authentication virtual code, as the encryption key.

Here, the command information may include at least one of an ID, a password, and a command of the IoT device 300 as described above.

The control server 100 may generate second information by combining the authentication virtual code and the encryption value in a predetermined manner, and may transmit the second information to the relay apparatus 200.

According to an embodiment, the control server 100 may arrange and combine the authentication virtual code and the command information back and forth, or may combine the authentication virtual code and the command information in a state where the authentication virtual code and the command information are alternately positioned by 1 bit. Any combination method is applicable as long as the combination method is a method related to character or code combination.

When the second information is received from the control server 100, the relay apparatus 200 may request verification by transmitting verification request information to the identification module 400 (S423). Here, the verification request information may include an authentication virtual code and a time value in the second information. The time value may be a time value at a point in time when the second information is received by the relay apparatus 200, or a time value at a current time.

The identification module 400 may verify the authentication virtual code upon request (S500).

The identification module 400 may perform verification by extracting a plurality of detailed codes included in the authentication virtual code by using an internally stored verification algorithm. Because the content related to the verification of an authentication virtual code is the same as described above in the first embodiment, a detailed description thereof will be omitted.

As described above, when the authentication virtual code according to an embodiment of the inventive concept is generated by combining the first code obtained by adding the OTP code value to the unique identification information value and the second code corresponding to the OTP code value, the identification module 400 may search for the real value (i.e., unique identification information) by subtracting the second code value from the first code value.

As described above, when the identification module 400 completes verification by determining that the authentication virtual code is normal, the identification module 400 may transmit the found unique identification information together with a response to verification completion to the relay apparatus 200 (S521).

The relay apparatus 200 may decrypt the encryption value in the second information by using the encryption key based on the transmitted unique identification information (S522).

For example, when the control server 100 encrypts the command information by using only the unique identification information the encryption key, the relay apparatus 200 may perform decoding by using the unique identification information.

For another example, when the control server 100 encrypts command information by using a value, which is obtained by combining the unique identification information and the authentication virtual code, as the encryption key, the relay apparatus 200 may perform decryption by using the unique identification information and the authentication virtual code. In an embodiment of the inventive concept, a method of encrypting and decrypting command information uses a symmetric key encryption method, and the method is a well-known content. Accordingly, a detailed description thereof will be omitted.

The relay apparatus 200 may deliver the decrypted command information to the IoT device 300. Accordingly, the IoT device 300 may be controlled only by the verified command.

Hereinafter, a third embodiment of generating and verifying an authentication virtual code will be described in detail with reference to FIG. 6.

The control server 100 may generate an authentication virtual code (S400). In more detail, the control server 100 may generate command information itself as an authentication virtual code. Because the content related to the generation of an authentication virtual code is the same as described above in the first embodiment, a detailed description thereof will be omitted.

The control server 100 may transmit third information, which is the authentication virtual code, to the relay apparatus 200 (S431).

In the third embodiment of generating and verifying an authentication virtual code according to an embodiment of the inventive concept, the authentication virtual code may be generated by using command information for controlling the IoT device 300 as a real value.

As described above, the control server 100 may generate the authentication virtual code by combining a first code obtained by adding an OTP code value to the command information value and a second code corresponding to the OTP code value.

Here, the command information may include at least one of an ID, a password, and a command of the IoT device 300 as described above.

According to an embodiment, the control server 100 may generate respective command information as an authentication virtual code, or may generate the command information as one authentication virtual code. For example, when the command information includes an ID, a password, and a command, the control server 100 may generate an authentication virtual code for the ID, an authentication virtual code for the password, and an authentication virtual code for the command or may generate one authentication virtual code for all of the ID, the passwords, and the command according to the embodiment.

When the third information is received from the control server 100, the relay apparatus 200 may request verification by transmitting verification request information to the identification module 400 (S432). Here, the verification request information may include an authentication virtual code and a time value in the third information. The time value may be a time value at a point in time when the third information is received by the relay apparatus 200, or a time value at a current time.

The identification module 400 may verify the authentication virtual code upon request (S500).

The identification module 400 may perform verification by extracting a plurality of detailed codes included in the authentication virtual code by using an internally stored verification algorithm. Because the content related to the verification of an authentication virtual code is the same as described above in the first embodiment, a detailed description thereof will be omitted.

As described above, when the authentication virtual code according to an embodiment of the inventive concept is generated by combining the first code obtained by adding the OTP code value to the command information value and the second code corresponding to the OTP code value, the identification module 400 may search for the real value (i.e., command information) by subtracting the second code value from the first code value.

As described above, when the identification module 400 completes verification by determining that the authentication virtual code is normal, the identification module 400 may transmit the found command information together with a response to verification completion to the relay apparatus 200 (S531).

The relay apparatus 200 may deliver the transmitted command information to the IoT device 300. Accordingly, the IoT device 300 may be controlled only by the verified command.

In the third embodiment of the inventive concept, the authentication virtual code may be generated regardless of the format of the command information different for the respective IoT device 300.

The IoT device 300 may have different formats for expressing an ID, a password, and a command of a device for each manufacturer or service provider. In an embodiment of the inventive concept, only values corresponding to the ID, password, and command may be generated as authentication virtual codes while the format of the ID, password, and command of the IoT device 300 is maintained, when the control server 100 generates an authentication virtual code. Accordingly, the relay apparatus 200 may identify and recognize a format and a value, may provide the identification module 400 with a value generated through the authentication virtual code, may receive the real value for the corresponding value from the identification module 400, and may match the format with the real value to transmit the matched result to the IoT device 300, thereby improving the control accuracy of the device.

FIGS. 3 to 6 illustrate that operations are performed sequentially. However, this is merely illustrative of the technical idea of the inventive concept. Those skilled in the art to which an embodiment of the inventive concept belongs may apply various modifications and variations by changing and performing the order of operations illustrated in FIGS. 3 to 6 or performing one or more operations in parallel without departing from the essential characteristics of an embodiment of the inventive concept. The operations described in FIGS. 3 to 6 are not limited to a time-series order.

Hereinafter, a SIM-based IoT device authentication system for verifying access to an IoT device when the SIM is included in an IoT device will be described in detail with reference to FIG. 7.

Figure 7:
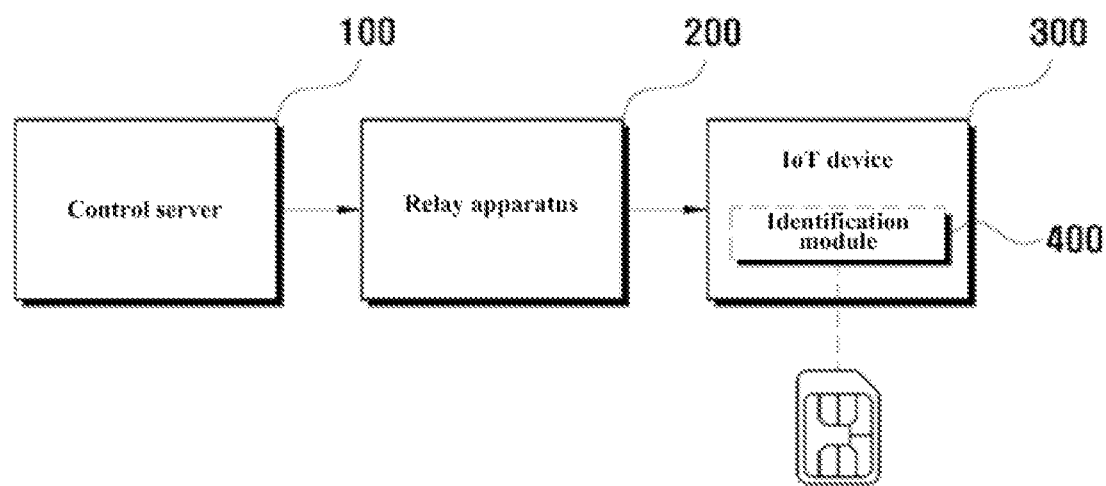
FIG. 7 is a diagram for describing a SIM-based IoT device authentication system, according to another embodiment of the inventive concept.

As shown in FIG. 7, an SIM-based IoT device authentication system (hereinafter, referred to as a "system") includes a control server 100, a relay apparatus 200, an IoT device 300, and an identification module 400. Herein, the system may include fewer or more components than the components illustrated in FIG. 1.

In an embodiment described with reference to FIGS. 1 to 6, the identification module 400 is included in the relay apparatus 200. In an embodiment to be described with reference to FIG. 7, the identification module 400 is included in the IoT device 300.

In this case, the IoT device 300 may perform the same function as the relay apparatus 200 described with reference to FIGS. 1 to 6. That is, when first information, second information, or third information including an authentication virtual code generated by the control server 100 is delivered to the IoT device 300 through the relay apparatus 200 (or directly without going through the relay apparatus), the identification module 400 may verify the authentication virtual code when the IoT device 300 requests verification while transmitting the authentication virtual code and a time value included in the corresponding information to the identification module 400.

Furthermore, when the identification module 400 completes verification by determining that the authentication virtual code is normal, the identification module 400 may transmit a response to verification completion to the IoT device 300.

When the response to verification completion is received from the identification module 400, the IoT device 300 performs an operation depending on command information. Accordingly, the IoT device 300 may be controlled only by the verified command.

A detailed description is the same as that described with reference to FIGS. 1 to 6, and thus it will be omitted to avoid redundancy.

Hereinafter, when the identification module 400 described above is inserted into a hardware device (a relay apparatus or an IoT device), a method in which the identification module 400 is activated will be described below.

According to an embodiment, when information for a verification operation of the identification module 400 is received from the control server 100, the hardware device may directly give a command to the identification module 400 through OS firmware in the device such that the identification module 400 performs the verification operation based on the received information.

According to an embodiment, when information for the verification operation of the identification module 400 is received from the control server 100, the hardware device may request a server of a communication service provider to send SMS including the information for the verification operation. Besides, upon request, the server of the communication service provider sends the SMS to the identification module 400, the identification module 400 may be driven based on the SMS and may perform the verification operation.

Meanwhile, an operation of the identification module 400 described in FIGS. 1 to 7 may be equally performed in the SIM card apparatus itself. A SIM card apparatus may include a communication module and a verification module.

The communication module may receive an authentication virtual code generated by a control server based on command information of at least one IoT device. Here, the communication module may perform the same operation as that of the above-described communication unit 410, and a detailed description thereof will be omitted to avoid redundancy.

The verification module may be formed in a form of an applet and may verify the authentication virtual code based on a verification algorithm. An operation in which the verification module performs verification by using an authentication virtual code is the same as that of the identification module described with reference to FIGS. 1 to 7, and thus a detailed description thereof will be omitted to avoid redundancy.

The verification module may operate as a processor of the SIM card, and may perform the same operation as the processor 420 described above. In detail, the processor may control overall operations of the SIM card in addition to operations related to applications stored in the memory of the SIM card. The processor may provide or process appropriate information or functions to the control server 100 or the IoT device 300, by processing a signal, data, information, or the like, which is input or output through the above-described components, or driving an application program stored in a memory.

Hereinafter, a first embodiment in which a SIM card apparatus is included in the relay apparatus 200, and a second embodiment and a third embodiment in each of which the SIM card apparatus is included in the IoT device 300 will be described with reference to FIGS. 8 to 10.

Figure 8:
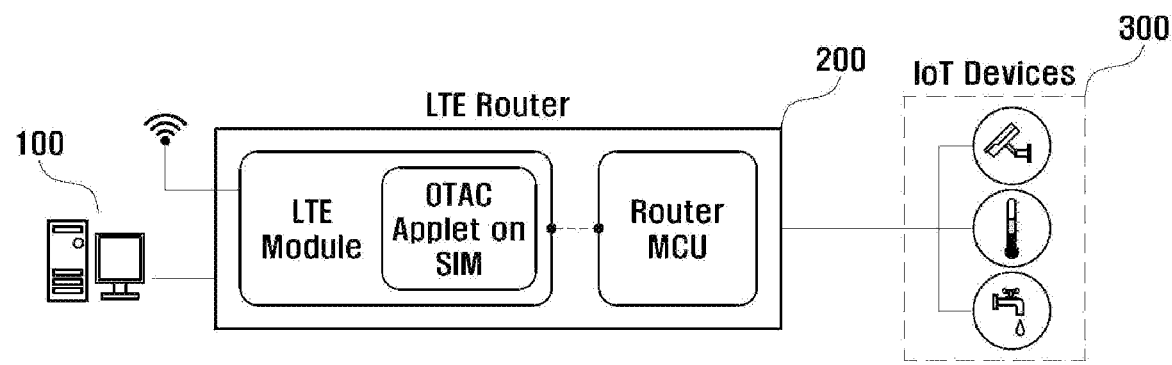
FIG. 8 is a diagram for describing an embodiment in the case where a SIM card apparatus is included in a relay apparatus, according to an embodiment of the inventive concept.

FIG. 8 is a diagram for describing an embodiment in the case where a SIM card apparatus is included in a relay apparatus, according to an embodiment of the inventive concept.

Figure 9:
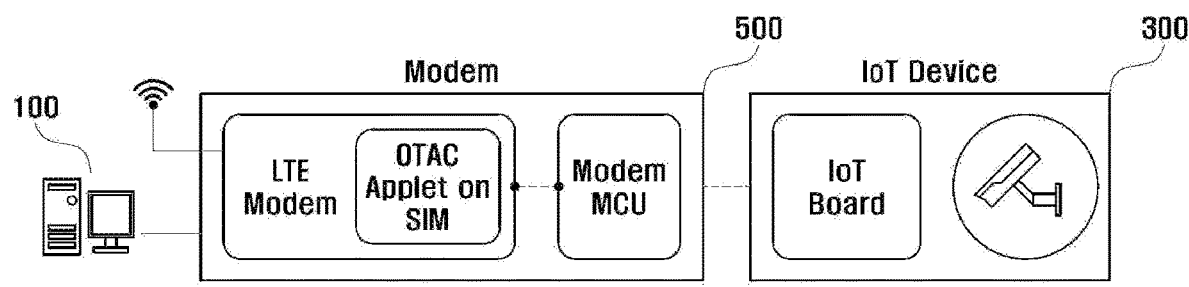
FIG. 9 is a diagram for describing an embodiment in the case where a SIM card apparatus is included in an IoT device, according to an embodiment of the inventive concept.

FIG. 9 is a diagram for describing an embodiment in the case where a SIM card apparatus is included in an IoT device, according to an embodiment of the inventive concept.

Figure 10:
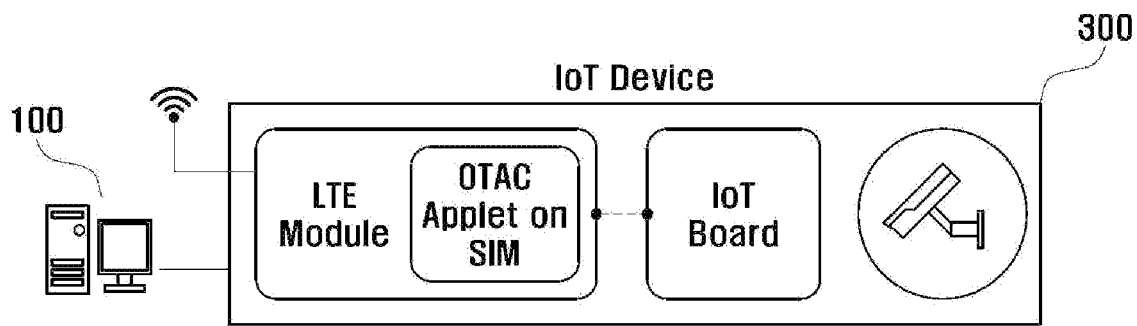
FIG. 10 is a diagram for describing another embodiment in the case where a SIM card apparatus is included in an IoT device, according to an embodiment of the inventive concept.

FIG. 10 is a diagram for describing another embodiment in the case where a SIM card apparatus is included in an IoT device, according to an embodiment of the inventive concept.

First, as described above, a SIM card apparatus according to an embodiment of the inventive concept may include a communication module and a verification module. The communication module may receive an authentication virtual code generated by the control server 100 based on command information of at least one IoT device. The verification module may be formed in a form of an applet and may verify the authentication virtual code based on a verification algorithm.

A first embodiment shown in FIG. 8 relates to a router model. Referring to FIG. 8, a SIM card apparatus may be included in the relay apparatus 200 (i.e., a router) connecting the control server 100 and the at least one IoT device 300.

In the first embodiment, when verification request information including the authentication virtual code is received from the relay apparatus 200 through the communication module, an applet-type verification module of the SIM card apparatus may verify the authentication virtual code based on the verification algorithm and may deliver the verified result to the relay apparatus 200 through the communication module. The relay apparatus 200 may determine whether to deliver the command information to the IoT device 300, based on the verified result.

In detail, when the control server 100 transmits the authentication virtual code (e.g., ABCDE11) based on the command information (e.g., open) to a router (a relay apparatus), a router MCU (the processor 210 in FIG. 2) may receive the authentication virtual code through an LTE module. Moreover, the router MCU may transmit the verification request information including the authentication virtual code to the applet-type verification module. The verification module may verify the received authentication virtual code. When it is completely verified that the authentication virtual code is a normal code, the verification module may transmit the command information (e.g., open) identified through the verification to the router MCU. The router MCU may transmit the command information to the corresponding IoT device through the LTE module such that the corresponding IoT device operates depending on the command information.

At this time, only when the command information or authentication virtual code received from the control server 100 is included in a specific area of a predetermined protocol, the router MCU may transmit verification request information to the verification module. Here, the protocol may include MQTT, CoAP, and HTTPS, but is not limited thereto. As described above, the command information may include at least one of an ID of the IoT device 300, a password of the IoT device 300, and a command for the IoT device 300.

The verification module may extract a plurality of detailed codes included in the authentication virtual code, and may verify the authentication virtual code based on the correlation between the plurality of detailed codes. Because a method of verifying an authentication virtual code is the same as described above, a detailed description thereof will be omitted.

Also, in the first embodiment, firmware of the router (in more detail, the router MCU) may be required to be changed. In other words, software settings in the router need to be changed according to a verification operation such that the verification module included in the router properly performs the verification operation, and thus the firmware change may be required.

A second embodiment shown in FIG. 9 relates to an IoT (host-control) model. Referring to FIG. 9, a SIM card apparatus may be included in a connection device 500 (i.e., a modem) for controlling the IoT device 300. That is, the second embodiment may be configured in a form of a board in which an LTE modem and an IoT board are separated from each other.

In the second embodiment, when verification request information including an authentication virtual code is received from the connection device 500 through the communication module, an applet-type verification module of the SIM card apparatus may verify the authentication virtual code based on the verification algorithm and may deliver the verified result to the connection device 500 through the communication module. The connection device 500 may determine whether to deliver the command information to the IoT device 300, based on the verified result.

In detail, when the control server 100 transmits the authentication virtual code (e.g., ABCDE11) based on command information (e.g., open) to a modem (a connection device), a modem MCU may receive the authentication virtual code through an LTE modem. Moreover, the modem MCU may transmit verification request information including the authentication virtual code to the applet-type verification module. The verification module may verify the received authentication virtual code. When it is completely verified that the authentication virtual code is a normal code, the verification module may transmit the command information (e.g., open) identified through the verification to the modem MCU. The modem MCU may transmit the command information to an IoT device through the LTE modem such that the IoT device operates depending on the command information.

At this time, only when the command information or authentication virtual code received from the control server 100 is included in a specific area of a predetermined protocol, the modem MCU may transmit verification request information to the verification module. Here, the protocol may include MQTT, CoAP, and HTTPS, but is not limited thereto. As described above, the command information may include at least one of an ID of the IoT device 300, a password of the IoT device 300, and a command for the IoT device 300.

The verification module may extract a plurality of detailed codes included in the authentication virtual code, and may verify the authentication virtual code based on the correlation between the plurality of detailed codes. Because a method of verifying an authentication virtual code is the same as described above, a detailed description thereof will be omitted.

Moreover, in the second embodiment, the LTE modem may need to be changed. In other words, the change of the LTE modem itself may be required for the verification module included in the modem to properly perform the verification operation.

A third embodiment shown in FIG. 10 relates to a stand-alone (IoT) model. Referring to FIG. 10, a SIM card apparatus may be included in the IoT device 300. That is, in the third embodiment, an LTE module and an IoT board may be configured in a form of one board.

In the third embodiment, when verification request information including an authentication virtual code is received from the IoT device 300 through the communication module, an applet-type verification module of the SIM card apparatus may verify the authentication virtual code based on the verification algorithm and may deliver the verified result to the IoT device 300 through the communication module. The IoT device 300 may operate based on the verified result and command information.

In detail, when the control server 100 transmits the authentication virtual code (e.g., ABCDE11) based on command information (e.g., open) to the IoT device, the IoT board may receive the authentication virtual code through the LTE module. Moreover, the IoT board may transmit verification request information including the authentication virtual code to the applet-type verification module. The verification module may verify the received authentication virtual code. When it is completely verified that the authentication virtual code is a normal code, the verification module may transmit the command information (e.g., open) identified through the verification to the IoT board. Because the verification is completed, the IoT board may operate based on the command information.

At this time, only when the command information or authentication virtual code received from the control server 100 is included in a specific area of a predetermined protocol, the IoT board may transmit verification request information to the verification module. Here, the protocol may include MQTT, CoAP, and HTTPS, but is not limited thereto. As described above, the command information may include at least one of an ID of the IoT device 300, a password of the IoT device 300, and a command for the IoT device 300.

The verification module may extract a plurality of detailed codes included in the authentication virtual code, and may verify the authentication virtual code based on the correlation between the plurality of detailed codes. Because a method of verifying an authentication virtual code is the same as described above, a detailed description thereof will be omitted.

Also, in the third embodiment, firmware of the IoT device (in more detail, the IoT board) may be required to be changed. In other words, software settings in the IoT device need to be changed according to a verification operation such that the verification module included in the IoT device 300 properly performs the verification operation, and thus the firmware change may be required.

The method according to an embodiment of the inventive concept may be implemented as a program to be executed in combination with a computer, which is hardware, and stored in a computer-readable recording medium.

For the computer to read the program and to execute the method implemented by the program, the program may include a code that is coded in a computer language, which a processor (e.g., a central processing unit CPU) of the computer may read through a device interface of the computer, such as C, C++, JAVA, or a machine language. The code may include a functional code related to a function that defines necessary functions executing the method, and the functions may include an execution procedure related control code necessary for the processor of the computer to execute the functions in its procedures. Furthermore, the code may further include a memory reference related code on which location (address) of an internal or external memory of the computer should be referenced by the media or additional information necessary for the processor of the computer to execute the functions. Further, when the processor of the computer is required to perform communication with another computer or a server in a remote site to allow the processor of the computer to execute the functions, the code may further include a communication related code on how the processor of the computer executes communication with another computer or the server or which information or medium should be transmitted/received during communication by using a communication module of the computer.

The steps of a method or algorithm described in connection with the embodiments of the inventive concept may be embodied directly in hardware, in a software module executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or a computer-readable recording medium well known in the art to which the inventive concept pertains.

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

According to an embodiment of the inventive concept, a relay apparatus or IoT device verifies whether a command sent by a control center is a normal command, through an SIM card by installing the SIM card storing information related to the IoT device in the relay apparatus or the IoT device. Accordingly, an IoT device may be controlled only by normal commands.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A subscriber identification module (SIM) card apparatus comprising:
   a communication module configured to receive an authentication virtual code generated by a control server based on command information of at least one IoT device; and
   a verification module formed in an applet form and configured to verify the authentication virtual code based on a verification algorithm,
   wherein the SIM card apparatus is included in a relay apparatus configured to connect the control server and the IoT device,
   wherein the control server is configured to: transmit control command information to the IoT device to control an operation of the IoT device; and monitor the IoT device by receiving various types of information from the IoT device,
   wherein the relay apparatus is configured to: serve as a relay between different networks; and transmit the control command information of the control server to the IoT device, and
   wherein the relay apparatus is further configured to verify access of the control server to the IoT device, and transmit the control command information of the control server to the IoT device only when the access is verified.

2. The SIM card apparatus of claim 1, wherein, when verification request information including the authentication virtual code is received from the relay apparatus through the communication module, the verification module verifies the authentication virtual code based on the verification algorithm and delivers the verified result to the relay apparatus through the communication module, and wherein the relay apparatus determines whether to deliver the command information to the IoT device, based on the verified result.

3. The SIM card apparatus of claim 2, wherein the verification request information is received from the relay apparatus only when the command information is included in a specific area of a predetermined protocol.

4. The SIM card apparatus of claim 1, wherein the verification module extracts a plurality of detailed codes included in the authentication virtual code, and verifies the authentication virtual code based on a correlation between the plurality of detailed codes.

5. The SIM card apparatus of claim 1, wherein firmware of the relay apparatus is required to be changed for a verification operation of the verification module.

6. A SIM card apparatus comprising:
a communication module configured to receive an authentication virtual code generated by a control server based on command information of at least one IoT device; and
a verification module formed in an applet form and configured to verify the authentication virtual code based on a verification algorithm,
wherein the SIM card apparatus is included in a connection device for controlling the IoT device,
wherein the control server is configured to: transmit control command information to the IoT device to control an operation of the IoT device; and monitor the IoT device by receiving various types of information from the IoT device,
wherein the connection device is configured to: serve as a connection between different networks; and transmit the control command information of the control server to the IoT device, and
wherein the connection device is further configured to verify access of the control server to the IoT device, and transmit the control command information of the control server to the IoT device only when the access is verified.

7. The SIM card apparatus of claim 6, wherein, when verification request information including the authentication virtual code is received from the connection device through the communication module, the verification module verifies the authentication virtual code based on the verification algorithm and delivers the verified result to the connection device through the communication module, and
wherein the connection device determines whether to deliver the command information to the IoT device, based on the verified result.

8. The SIM card apparatus of claim 7, wherein the verification request information is received from the connection device only when the command information is included in a specific area of a predetermined protocol.

9. The SIM card apparatus of claim 6, wherein the verification module extracts a plurality of detailed codes included in the authentication virtual code, and verifies the authentication virtual code based on a correlation between the plurality of detailed codes.

10. A SIM card apparatus comprising:
a communication module configured to receive an authentication virtual code generated by a control server based on command information of at least one IoT device; and
a verification module formed in an applet form and configured to verify the authentication virtual code based on a verification algorithm,
wherein the SIM card apparatus is included in the IoT device,
wherein the control server is configured to: transmit control command information to the IoT device, through a relay apparatus, to control an operation of the IoT device; and monitor the IoT device by receiving various types of information from the IoT device, through a relay apparatus,
wherein the relay apparatus is configured to: serve as a relay between different networks; and transmit the control command information of the control server to the IoT device, and
wherein the IoT device is configured to verify access of the control server to the IoT device, and transmit a verification result to the relay apparatus so that the relay apparatus transmits the control command information of the control server to the IoT device only when the access is verified.

11. The SIM card apparatus of claim 10, wherein, when verification request information including the authentication virtual code is received from the IoT device through the communication module, the verification module verifies the authentication virtual code based on the verification algorithm and delivers the verified result to the IoT device through the communication module, and
wherein the IoT device operates based on the verified result and the command information.

12. The SIM card apparatus of claim 11, wherein the verification request information is received from the IoT device only when the command information is included in a specific area of a predetermined protocol.

13. The SIM card apparatus of claim 10, wherein the verification module extracts a plurality of detailed codes included in the authentication virtual code, and verifies the authentication virtual code based on a correlation between the plurality of detailed codes.

14. The SIM card apparatus of claim 10, wherein firmware of the IoT device is required to be changed for a verification operation of the verification module.

* * * * *